DATA TRANSLATOR

Filed March 28, 1960

2 Sheets-Sheet 1

INVENTOR.
Robert F. Shaw

BY S.C. Yuter

ATTORNEY

INVENTOR.
Robert F. Shaw
BY
ATTORNEY

3,121,860
DATA TRANSLATOR

Robert F. Shaw, Locust Valley, N.Y., assignor to Digitronics Corporation, Albertson, N.Y., a corporation of Delaware Filed Mar. 28, 1960, Ser. No. 18,058
15 Claims. (Cl. 340—172.5)

Figure 1:
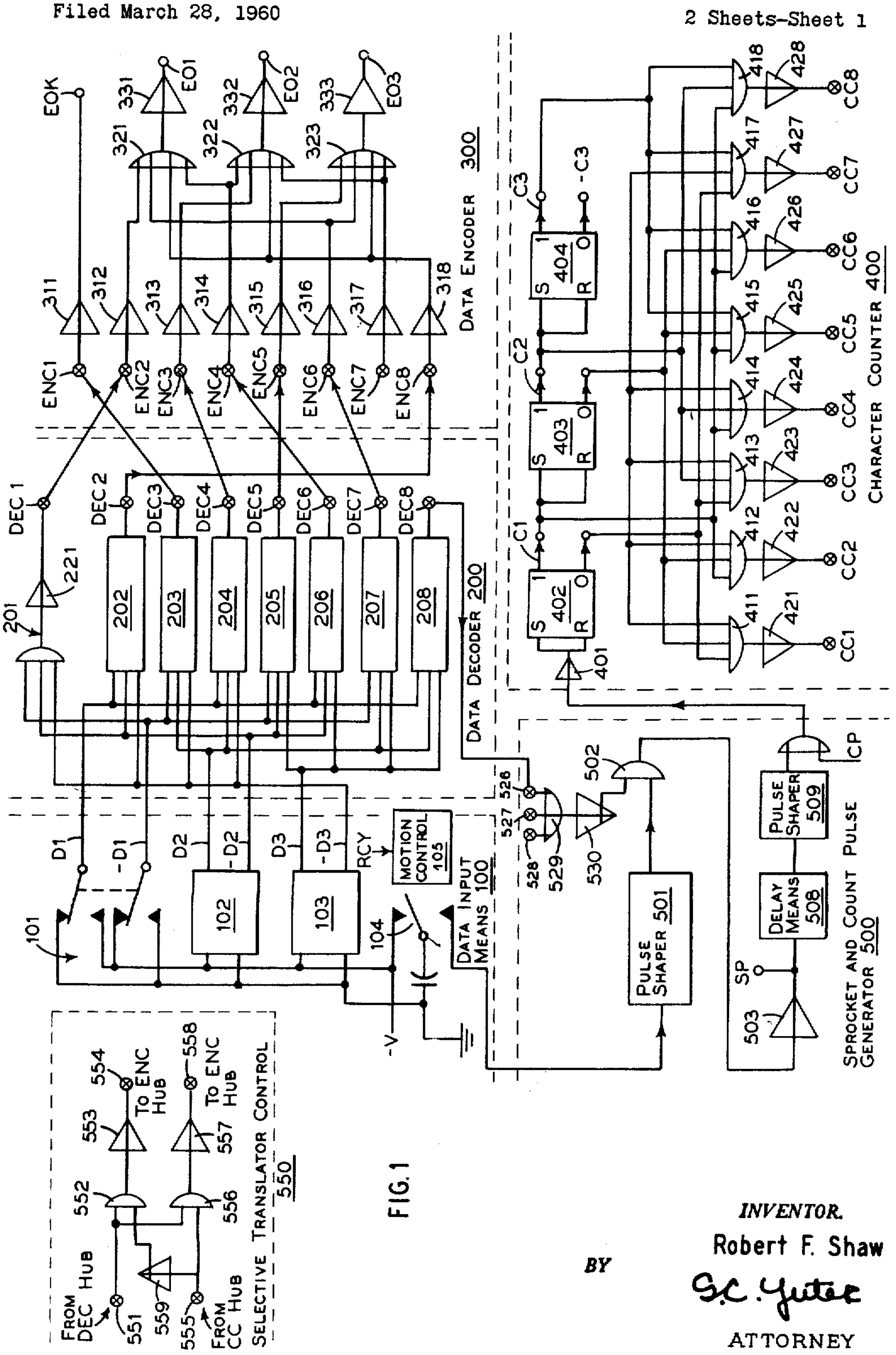

This invention relates to data translators, and more specifically to translators for transcribing data from one recording medium, such as magnetic tape, punched paper tape, or punched cards to another recording medium of the same or a different type.

Because of the widely varying characteristics of existing computing, data processing and communication systems which employ such recording or storage media as those previously mentioned, the codes in which data are recorded are sufficiently different that some type of code or "language" translation is needed in going from one storage medium or recording medium to another. For example, the punched paper tape normally used for the recording of information handled on telegraph lines contains five levels or channele of information and therefore any character can take on only one of thirty-two possible values. It is necessary to provide case shift mechanisms for distinguishing between letters and figures. On the other hand most magnetic tape recording systems as used in modern data processing provide six information levels and therefore it is possible to obtain sixty-four different combinations for any given character. This is more than adequate for accommodating all alphabetic characters and numerals as well as a number of special symbols. (These three types of information will hereinafter be considered under the generic name of characters.) Because of this difference, however, between punched paper tape and magnetic tape coding, it is necessary in any device for transcribing data from one of these media to the other to provide translation facilities; that is, facilities for interpreting the character being read from the input medium and encoding that character into the proper form for recording on the output medium. This function is the basic function of the data translator.

In most cases, however, in order to relieve other equipment of unnecessary work, it is desirable, in combination with this translation function, to call upon the data translator to perform certain editing operations on the data. In particular, these operations may involve the suppression of certain specific unwanted characters whenever they occur on the input medium, for example, the seventh through thirteenth characters of an input message may not be recorded on an output medium. Another editing operation may be the translation of a given character into one of two or more possible characters depending upon its position in a message; for example, the number three of an input message is always transmitted as the number three in an output message unless it is the twentieth character in the message when it will be translated as the fraction ⅜. The insertion of additional characters in the output message in addition to those which appear in the input message, the suppression of non-significant zeros in numerical fields, and the skipping of portions of the input data so that they are not recorded on the output medium, are further examples of editing operations.

It is possible to control the occurrence of all these editing operations in many cases by the position of a character in a message, all input data being normally broken down into messages of some standard length or at least having some identifiable starting point. Thus, for example, in translating data from magnetic tape to paper tape it might be necessary to insert a carriage return and a line feed or possibly a space symbol ahead of the fourth character in a message.

It is accordingly a general object of the invention to provide a data translator which can perform a variety of editing operations.

It is another object of the invention to provide a data translator which can perform editing operations with a minimum of equipment.

It is a further object of the invention to provide apparatus which receives data in a first coded representation, translates the data into a second coded representation and simultaneously edits the data, and transmits the data in the translated and edited form.

Briefly, the invention contemplates the provision of means in a data translator for selectively translating characters, suppressing characters, inserting additional characters in output data, suppressing nonsignificant zeros in numerical fields, and skipping groups of contiguous characters, all in accordance with the position within a message at which these functions are desired to occur, or in accordance with the appearance of specified input characters.

Figure 2:
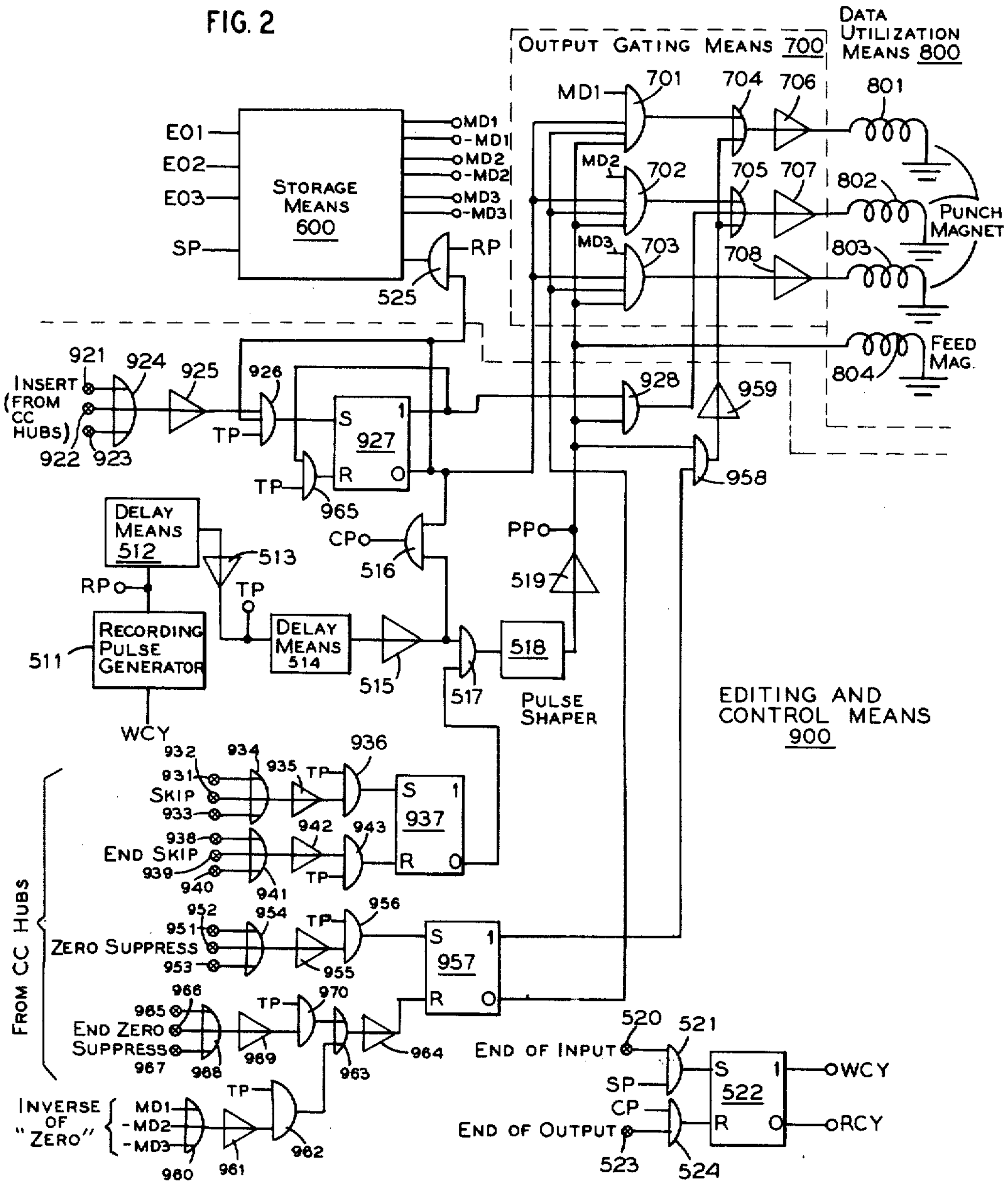

Other objects, features and advantages of the invention will be apparent from the following detailed description when read with the accompanying drawings wherein:

FIGURE 1 is a symbolic diagram of, generally, the input portion of a data translator; and FIGURE 2 is a symbolic diagram of, generally, the output portion of the data translator in accordance with a preferred embodiment of the invention.

Referring now to FIGURE 1, it will be seen that the data translator includes data input means 100, data decoder 200, data encoder 300, character counter 400, sprocket and count pulse generator 500 and the selective translation control 550, which primarily comprise the input section of the data translator. FIGURE 2 shows the storage and output section of the data translator, which comprises storage means 600, output gating means 700, data utilization means 800 and editing and control means 900. Each of these sections of the data translator will now be described in detail.

Data input means 100, by way of example, comprises a plurality of electrical contacts 101, 102 and 103, such as might be found on a mechanical reader for punched paper tape. In the example, solely for simplification, only three data channels have been shown, whereas in actual practice a minimum of five data channels would commonly be used. In many cases a sixth data channel and, possibly, additional channels for parity checking or other purposes would also be included. It should be understood that the data input means 100 may also be a magnetic tape transport with the necessary reading heads, reading amplifiers, and input storage means, or it may be a reader for punched cards, or any other necessary means for reading data into the data translator. In any event, the sets of electrical contacts 101, 102 and 103 corresponding to the three data channels produce signals of a push-pull nature i.e., D1 and −D1, D2 and −D2, D3 and −D3 respectively. For example, when a hole is sensed in the first data channel of the punch paper tape, ground voltage is present as signal D1 and a negative voltage is present at signal −D1. On the other hand, if a hole is not sensed in the first data channel, signal D1 is negative and signal −D1 is at ground potential.

In addition to the electrical contacts, 101, 102 and 103 which supply data signals, there is provided electrical contact 104 which produces a timing or sprocket signal which occurs once for every character read. The timing of the output signal from electrical contact 104 is chosen to be a little later than signals D1, D2, D3 etc. The electrical contacts 101, 102 and 103 will be fully closed at the occurrence of the sprocket signal, so as to insure that the signals D1, D2, D3, etc. will be stabilized. A motion control 105 enables the input data means to read characters sequentially from the input medium (tape, card, etc.) as long as a signal RCY is present, which indicates that an input cycle is being performed.

The data decoder 200 includes a diode matrix of a type well known to the art. By way of example, the diode matrix comprises eight three-input decoders 201 to 208, to which the push-pull signals D1, D2 and D3 are applied. These decoders 201 to 208 decode the eight possible combinations of the three input signals D1, D2 and D3 and transmit an output signal from one of the decoder hubs DEC1 to DEC8 which are located on a plug board (not shown) for each of the eight possible combinations of input signals.

A typical decoder 201 comprises the three input diode "and" gate 211 which drives amplifier 221. Amplifier 221, which is not logically necessary, is usually desirable because the signals from "and" gate 211 are not sufficiently strong to drive other circuitry, particularly where transistors are used. The output of amplifier 221 is connected, for convenience in changing the translation setup, to decoder hub DEC1 on the plugboard. Whenever the binary character zero i.e. (000) is sensed by data input means 100, decoder 201 will transmit as signal to decoder hub DEC1. Similarly, if data input means 100 senses the binary character 7, i.e. (111) decoder 208 will transmit a signal from decoder hub DEC8. More generally, for each of the eight possible distinct characters read by the data input means 100, one and only one signal will appear on the respective one of the eight decoder hubs DEC1 through DEC8.

The data encoder 300 receives any one of a maximum of eight possible signals and encodes it into a group of signals EO1, EO2, EO3 which represent this signal, in coded form, in the code appropriate to the output recording means fed by the data translator. By adding additional signals EO4, EO5, etc., it is of course possible to encode sixteen, thirty-two or more different signals instead of the eight shown. Generally, when an input signal is received by a given one of the encoder hubs ENC1 through ENC8, a combination, unique to such given hub, of the signals EO1, EO2 and EO3 is generated by the data encoder 300. This is accomplished by diode "or" circuits 321, 322 and 323 which allow any of the signals from the encoder hubs ENC1 through ENC8 to be transmitted into the proper combination of output channels. Amplifiers 311 through 318 are provided, again not because they are logically necessary but rather for practical reasons, and likewise amplifiers 331, 332 and 333 are provided in order to supply sufficient current for the circuits to which the signals EO1, EO2 and EO3 are connected.

Through the use of conventional plugboard patching techniques, therefore, it is possible to interconnect the decoder hubs DEC with the encoder hubs ENC in any desired fashion, so that, for example, the character 010 read by the data input means 100 will be transmitted from data encoder 300 as the character 011. In general, any combination of input signals can be made to appear as any other combination or the same combination of output signals. This is the basic translation function of the data translator.

In order to control the editing features, it is necessary to obtain by some means a signal which will indicate the position of the characters in each message. This is accomplished by means of the character counter 400. In the example shown, the character counter comprises amplifier 401 driving a three stage binary counter which includes flip-flops 402, 403 and 404 connected as counter stages. Such a three stage counter can of course count only to eight and therefore would be appropriate for only an extremely short message of no more than eight characters. In practice, a sufficient number of counter stages would be used to enable the character counter to count the maximum number of characters which might occur in the message. In a typical case, this might be anywhere from eighty to a thousand or more characters.

The character counter 400 is stepped every time a character is read into the data translator by a sprocket signal from the electrical contact 104 of the data input means 100. This signal is transmitted to the sprocket and count pulse generator 500 where it is reshaped by pulse shaper 501 and passes through "and" gate 502, amplifier 503, delay means 508, pulse shaper 509 and "or" circuit 510, to the character counter 400. Thus, assuming the character counter 400 is at the clear (000) position at the beginning of the message, the state of the flip-flops 402 to 404 at any given time will correspond to the number of characters which have been read in during that message. For example, if the character counter 400 is such that flip-flop 404 is set and flip-flops 402 and 403 are not set (binary 100) this indicates that four characters have been read in and the fifth character is about to come in.

The outputs of the flip-flops 402 to 404 are decoded by "and" gates 411 through 418 to give eight unique signals, one for each possible configuration of the character counter 400. These signals are amplified by amplifiers 421 through 428, which again are not logically necessary but are desirable in practice, and are brought out to character counter hubs CC1 through CC8 on the plugboard for ease in connecting to various control circuits hereinafter described.

The input sprocket signal from amplifier 503, in addition to passing through delay means 508 to step the character counter 400, is used to give the SP signal. Now, turning to FIGURE 2, it can be seen that the SP signal is received by storage means 600, where it serves to indicate that a new character represented by coded combinations of the signals EO1 through EO3 from the data encoder 300 is ready to be stored. The storage means 600 can be any one of several types well known and commonly employed in data processing equipment such as, for example, shift registers or a magnetic core coincident current matrix storage. The purpose of the storage means 600 is to provide for cases where the rate at which information is read into the data translator differs appreciably from that at which it is read out from the data translator. Actually the storage means 600 can be omitted in certain cases, particularly those in which the input and output are relatively slow and do not differ greatly in speed. However, in many cases, such as translation from magnetic tape to punched paper tape, the storage means is a practical necessity. Thus as each character is read from the input medium, whether it be paper tape, magnetic tape, or some other source, it is translated and the translated characters are stored in the storage means 600. After a slight delay introduced by delay means 508, the character counter 400 is stepped to its next position. See FIGURE 1. The purpose of the delay is to avoid stepping the character counter 400 until the encoded character has been stored. This process continues until the end of the input message is reached.

At the end of the input message, it is necessary to shift over from an input cycle to an output cycle. During an output cycle, no data are read into the data translator by data input means 100, but the data stored in storage means 600 (FIGURE 2) are fed to the output medium through the data utilization means 800, which may be a paper tape punch, or a magnetic tape transport and a set of recording circuits for magnetic tape, or some other means for recording data on an output medium. In order to inform the data translator that the end of the message has been reached, it is necessary to provide some type of indicating signal. This may be a distinctive character in the input data or it may be the fact that the character counter 400 has reached a predetermined position. In either case, the information is connected by means of plugboarding to a hub 520 marked "end of input" of editing and control means 900.

The signal transmitted to hub 520 may be obtained either from one of the decoder hubs DEC1 through DEC8 if the end of input data indication is a distinctive character in the input data, or it may be obtained from one of the character counter output hubs CC1 through CC8 if the end of data indication is a predetermined position of the character counter. In either case, the result will be to cause the passing of a sprocket pulse through "and" gate 521 to set the flip-flop 522, causing the generation of a WCY or write cycle signal, and ending the generation of a RCY or read cycle signal, whose termination stops the reading of data from the input medium by the input data means 100.

The effect of the write cycle signal WCY is to initiate the generation of a sequence of recording pulses through a recording pulse generator 511, and (if the nature of the data utilization means requires it) to actuate a motion control to move the output medium (tape, card, etc.). The recording pulse generator 511 may either be a multivibrator, or in certain cases (for example, when the output is to go to punched paper tape) may simply be a means for gating synchronizing signals from the paper tape punch. In either case, the result is to produce RP recording pulses.

The RP recording pulses are transmitted to storage means 600. There each time an RP pulse occurs, a new character is transmitted from the output of the storage means 600 as a combination of the signals MD1, MD2 and MD3. These signals correspond to the input signals EO1, EO2 and EO3 in that they represent the same coding as was received by the storage means 600 during the input cycle.

After passing through delay means 512, amplifier 513, delay means 514, and amplifier 515, whose purpose is hereinafter described, each RP pulse as delayed, is applied to "and" gates 516 and 517. "And" gate 516 passes this pulse as a CP pulse, which will step the character counter 400 by way of "or" circuit 510 in FIGURE 1. "And" gate 517 also passes the RP pulse to trigger a pulse shaper 518 whose output is amplified by amplifier 519 to generate the PP signals which cause recording of the character by the data utilization means 800.

In particular, the PP signals are transmitted to "and" gates 701, 702 and 703 to control the transmission of the coded output signals MD1, MD2 and MD3 from storage means 600 to the punch magnets 801, 802 and 803 in the example shown, via "or" circuits 704 and 705 and amplifiers 706–708 so that the character is punched out on the output tape. At the same time, the PP signals actuate the feed magnet 804 to advance the paper tape one character position. This process continues until the entire message has been punched, at which time a signal to hub 523 (the "end of output" hub) will cause flip-flop 522 to be reset, ending the write cycle and initiating another read cycle.

The signal to the hub 523, it will be assumed here, is received from one of the character counter hubs CC1 through CC8 and therefore causes termination of the output cycle after a predetermined number of output characters have been punched. It can easily be seen that it will also be possible to decode one of the output characters represented by signals MD1, MD2 and MD3 to terminate the output cycle on occurrence of a distinctive output character in the data. Upon completion of the write cycle a new input cycle is initiated and the next message is read from the data input means 100.

This preceding description has been concerned with the case of simple translation where no editing operations were involved. The typical editing operations provided will now be described in detail.

Two types of editing can occur during the read or input cycle. The first is concerned with the suppression of certain specified characters. Examples of this would be the suppression of either case shift characters in reading from punched paper tape, or the suppression of blank or "ignore" characters. In any case, the purpose of the suppress operation is not only to prevent these characters from entering the storage means 600, but also to prevent them from stepping the character counter 400. In consequence, the "gap" in the message, caused by the deletion of these characters, is "closed up." In the output data, there is an immediate succession of the two input data characters which had been separated by the suppressed character.

The specific character suppression means is shown in FIGURE 1 comprising three specific character suppression hubs 526, 527 and 528, although of course more or less can be provided. Specific character suppression hubs 526, 527 and 528 are coupled to input terminals of "or" circuit 529 whose output terminal is coupled to inverting amplifier 530.

The purpose of inverting amplifier 530 is to provide a blocking or inhibitory signal to "and" gate 502 for preventing the occurrence of a sprocket pulse SP when the character is suppressed. Since the SP pulse does not occur, in the first place the storage means 600 is not notified to accept a new character, and in the second place the character counter 400 is not stepped. Thus, if the signal from any decoder hub DEC1 through DEC8 is plugged to one of the specific character suppression hubs, 526, 527 or 528 the corresponding character, whenever it is read by data input means 100, will be simply ignored.

The other type of editing which can occur during an input cycle may be called a "selective translation" function. This function is mechanized as follows: a character from one of the decoder hubs DEC1 through DEC8 is plugged to a data hub 551 on one of the selective translation circuits 550, of which there may be a plurality although only one is shown in FIGURE 1. Absence or presence of a control signal on control hub 555 determines the alternative operations of selective translation circuit 555; the control signal is derived from one of the character counter hubs CC1 through CC8.

In the absence of control signal on hub 555, the signal from one of the decoder hubs DEC1 to DEC8 will enter hub 551 and pass through "and" gate 552 and amplifier 553 to the normal output hub 554. Normal output hub 554 is generally patched to one of the encoder hubs ENC1 through ENC8. On the other hand, if at the time the character occurs, a control signal is present at hub 555, normal translation will not occur because inverting amplifier 559 will block "and" gate 552. The control signal on control hub 555 will instead allow the data signal from hub 551 to pass through "and" gate 556 and amplifier 557 to alternate output hub 558.

The results of the alternative operations of circuit 555 will be appreciated by assuming for example, that the normal output hub 554 is plugged to encoder hub ENC3 and that the alternate output hub 558 is plugged to encoder hub ENC7. In the absence of the control signal on hub 555, the data signal entering hub 551 will appear in the output data as the code corresponding to encoder hub ENC3. However, in the presence of the control signal (that is, in that particular position in the message where the character counter transmits the signal into control hub 555) the same data character will appear in the output data as the code corresponding to encoder hub TNC7.

The other editing features in accordance with the invention take place during the output cycle. The first of these to be described will be the "insert" feature. It is often necessary to insert extra characters in the data. A typical example of this requirement is the case where the output is punched paper tape to be fed over a telegraph wire system to teleprinter equipment. In this case line feeds, carriage returns, spaces and similar characters are required in order to make the output data come out in convenient format. These latter characters do not necessarily appear in the input data, since in many cases such input data is information in a form more appropriate for use in a digital computer, for which such extraneous characters are unnecessary and even undesirable, because wasteful of storage space.

In the example shown, only one type of character insert has been indicated. Assume for example, that the character to be inserted is a carriage return symbol, and that the carriage return code in the "language" of the output of this translator is the code 010. Therefore, in order to insert a carriage return code it is necessary to punch an additional character, for which the punch magnet 802 is energized and punch magnets 801 and 803 are not. Of course the feed magnet 804 is always energized if any character is to be punched.

Now, returning to the recording pulse generator 511 (FIGURE 2), it will be recalled that this generator produced an RP pulse which caused the character to be transmitted from storage means 600 ready for punching. The RP pulse also passed through a delay means 512 whose output, amplified by amplifier 513, is the TP pulse. This is a test pulse and its purpose is to determine, before the punching actually occurs, whether some change necessitated by one of the editing operations must be made before punching.

In the presently considered case, the TP pulse is applied to "and" gate 926 and if at the time the TP pulse occurs a signal from the character counter 400 (one of the character counter hubs CC1 to CC8) has been applied to one of the "insert" hubs 921, 922 or 923, the signal from the character counter hub CC will be amplified by amplifier 925 and will permit the TP pulse to pass through "and" gate 926 to set flip-flop 927. The result of setting the flip-flop 927 will be to block the normal punch feeding "and" gates 701, 702 and 703, preventing the characters set up at the output of the storage means 600 from punching. However, flip-flop 927 will transmit an allow signal to "and" gate 928.

Now, referring back to the chain of circuits starting with the recording pulse generator 511, it will be seen that the TP pulse is further delayed by delay means 514, amplified by amplifier 515 and transmitted through "and" gate 517 to the pulse shaper 518 which generates the PP recording pulse. This PP pulse is passed by "and" gate 928 and in this case actuates the punch magnet 802, resulting in the punching of the carriage return character. Meanwhile, the character which would normally have been punched in this position is still available at the output of the storage means 600 and should be punched before the character counter 400 is stepped. Therefore, the "zero" output of flip-flop 927 is used to block "and" gate 516, so that no CP pulse occurs and so that the character counter 400 is not stepped during the punching of the carriage return character.

After the carriage return character has been punched, another recording RP pulse occurs in the normal course of events, since these RP pulses occur continuously, but this RP pulse cannot call for another character from the storage means 600, since "and" gate 525 is blocked by the "zero" output of flip-flop 927. This blocking is necessary because the character waiting in the output of the storage means 600 has not yet been punched and therefore must be held for another punch cycle.

Following the last discussed RP pulse, another TP pulse occurs after a slight delay and this TP pulse is used to reset flip-flop 927 by way of "and" gate 965. Meanwhile, "and" gate 926 is blocked by the zero output of flip-flop 927 so that no conflict occurs and no attempt is made to set flip-flop 927 a second time.

Since the TP pulse resets flip-flop 927, the inhibition on the punch feeding "and" gates 701, 702 and 703 is removed and the character which had been waiting in the output of the storage means 600 is allowed to be punched. Likewise the inhibition is removed from "and" gate 516, generation of the CP pulses is once more enabled, and normal stepping of the character counter

400 resumes. Therefore, normal operation is fully resumed and will continue until another "insert" signal appears at one of the insert hubs 921 through 923.

The "zero suppress" feature uses the circuitry shown at the bottom of FIGURE 2. Zero suppression is initiated, like the other output editing operations, by a signal from character counter 400. This signal is applied from one of the character counter hubs CC1 through CC8 to one of the zero suppress hubs 951 through 953 and its effect is to set flip-flop 957 by gating a TP pulse, when it occurs, through "and" gate 956. The setting of flip-flop 957 blocks the normal punch feeding gates 701, 702, 703 in the same way that they were blocked when the extra character was inserted. At the same time flip-flop 957 transmits a permit signal to "and" gate 958, where it gates the PP signal into punch magnets 801 and 802. This particular code (punch magnets 801, 802 being energized and punch magnet 803 not) is assumed to correspond to the "space" code, since in most cases for editing purposes one wishes to replace non-significant zeros in a numerical field by space symbols. If this is done, the data appearing in printed form, when the tape being prepared by the translator is fed through a printer, will be in more conventional form. Therefore, the result of the setting of flip-flop 957 is to block the "zero" code signals that would normally pass through the normal punching gates 701, 702, 703 and substitute for them a space symbol on each punch cycle.

Since only non-significant zeros are to be suppressed, it is necessary to end the zero suppression as soon as a non-zero character occurs. This is accomplished by resetting flip-flop 957 upon the occurrence of any character other than zero. In order to accomplish this the inverse of the zero code is applied to "or" circuit 960. By applying the inverse of the zero code it is assured that no signals pass through "or" circuit 960 if a zero code is present, but if the signals for any other code occurs, at least one of the inputs of "or" circuit 960 will be energized and will transmit a signal which permits a TP pulse to pass through "and" gate 962. This signal passes through "or" circuit 963 and amplifier 964 to reset flip-flop 957 ending the zero suppression.

It is also often necessary to end the zero suppression at a particular point in the message even though zero characters may still be occurring from the storage means. This would be true, for example, in fields where it is desired to print zeros, even though they be non-significant, for example, in the "cents" position of a money field, but not in the dollars position. To provide for this situation "end zero suppress" hubs 965, 966 and 967 have been provided. If the character counter is in the appropriate position, one of its counter hubs CC1 through CC8 will emit a signal to one of the "end zero suppress" hubs. Such signal will reset flip-flop 957, ending the zero suppression regardless of the fact the zeros may still be occurring in the data.

Finally, the "skip" feature is performed by circuits located directly above the zero suppress circuitry. When it is necessary to skip a group of characters in the message during the output cycle, one of the character counter hubs CC1 through CC8 is plugged to one of the skip hubs 931, 932, or 933. A signal on one of the skip hubs sets flip-flop 937 by permitting a TP pulse to pass through "and" gate 936. The zero output of flip-flop 937 blocks "and" gate 517 so that pulse shaper 518 cannot be triggered to generate PP pulses. Therefore, the output tape is not advanced and no data are punched as long as flip-flop 937 remains set. Another of the character counter hubs CC1 through CC8 can be coupled to one of the "end skip" hubs 938, 939 and 940 to reset flip-flop 937, allowing the punching to be resumed.

There has thus been shown an improved data translator which can perform many editing operations with a minimum of equipment. The apparatus, by employing a character counter means, permits, in a simple manner, the suppression of unwanted characters, the selective translation of certain of the characters, the insertion of certain characters, the suppression of zero characters and the skipping over of fields of characters.

While only one embodiment of the invention has been shown and described in detail, there will now be obvious to those skilled in the art many modifications accomplishing many or all of the objects and gaining many of the advantages, but which do not depart from the spirit of the invention as defined by the claims which follow.

What is claimed is:

1. Data translating apparatus comprising data input means for serially converting groups of character-representing indicia, recorded on a first record medium, to coded combinations of converted signals; signal translating means for translating the converted signal combinations to character-representing coded combinations of translated signals; data output means for reconverting the translated signal combinations to groups of character-representing indicia compatible with recording on a second record medium; character counter means for counting characters handled by said data translating apparatus; specific character suppression means responsive to a first specific coded combination of converted signals representing a specific character, for preventing said translating means from translating such specific signal combination, and for preventing said character counter means from counting said specific character; selective translation means responsive to said character counter means for causing said signal translating means to translate a second specific combination of converted signals representing a selected character to one alternative coded combination of translated signals as long as said character counter means does not contain a preselected count and to a second alternative coded combination of translated signals when said character counter means does contain said preselected count; character insertion means responsive to said character counter means for delaying the transfer of translated signal combinations from said signal translating means and for transmitting a coded combination of inserted signals to said data output means when said character counter means contains a predetermined count; zero suppression means including a two state control means; means coupling said two state control means to said character counter means for shifting said two state control means to a first state for preventing the transfer of translated signal combinations representing the character zero to said data output means when said character counter means contains a first particular count, and means coupling said two state control means to said character counter means and said signal translating means for shifting said two state control means to its second state when either a second particular count is in said character counter means, or said signal translating means is prepared to transfer a coded combination of translated signals representing a character other than the character zero; and character skipping means responsive to said character counter means for preventing the transfer of translated signals from said signal translating means to said data output means from the time a first prespecified count is in said character counter means until the time a second prespecified count is in said character counter means.

2. Data translating apparatus comprising data input means for serially converting groups of character-representing indicia, recorded on a first record medium, to coded combinations of converted signals; signal translating means for translating the converted signal combinations to character-representing coded combinations of translated signals; data output means for reconverting the translated signal combinations to groups of character-representing indicia compatible with recording on a second record medium; character counter means for counting characters handled by said data translating apparatus, and specific character suppression means responsive to a specific coded combination of converted signals representing said specific character for preventing said signal translating means from translating such specific combination of signals and for preventing said character counter means from counting said specific character.

3. Data translating apparatus comprising data input means for serially converting groups of character-representing indicia, recorded on a first record medium, to coded combinations of converted signals; signal translating means for translating the converted signal combinations to character-representing coded combinations of translated signals; data output means for reconverting the translated signal combinations to groups of character-representing indicia compatible with recording on a second record medium; character counter means for counting characters handled by said data translating apparatus, and selective translation means responsive to said character counter means for causing said signal translating means to translate a specific combination of converted signals representing a selected character to one alternative coded combination of translated signals as long as said character counter means does not contain a particular count and to a second alternative coded combination of translated signals when said character counter means does contain said particular count.

4. Data translating apparatus comprising data input means for serially converting groups of character-representing indicia, recorded on a first record medium, to coded combinations of converted signals; signal translating means for translating the converted signal combinations to character-representing coded combinations of translated signals; data output means for reconverting the translated signal combinations to groups of character-representing indicia compatible with recording on a second record medium; character counter means for counting characters handled by said data translating apparatus, and character insertion means responsive to said character counter means for delaying the transfer of a coded combination of translated signals from said signal translating means and for transmitting a coded combination of inserted signals to said data output means when said character counter contains a predetermined count.

5. Data translating apparatus comprising data input means for serially converting groups of character-representing indicia, recorded on a first record medium, to coded combinations of converted signals; signal translating means for translating the converted signal combinations to character-representing coded combinations of translated signals; data output means for reconverting the translated signal combinations to groups of character-representing indicia compatible with recording on a second record medium; character counter means for counting characters handled by said data translating apparatus, and zero suppression means including a two state control means, means coupling said two state control means to said character counter means for shifting said two state control means to a first state for preventing the transfer of translated signal combinations representing the character zero to said data output means when said character counter contains a first particular count, and means coupling said two state control means to said character counter means and said signal translating means for shifting said two state control means to its second state when either a second particular count is in said character counter means or said signal translating means is prepared to transfer a coded combination of translated signals representing a character other than the character zero.

6. Data translating apparatus comprising data input means for serially converting groups of character-representing indicia, recorded on a first record medium, to coded combinations of converted signals; signal translating means for translating the converted signal combinations to character-representing coded combinations of translated signals; data output means for reconverting the translated signal combinations to groups of character-representing indicia compatible with recording on a second record medium; character counter means for counting characters handled by said data translating apparatus, and character skipping means responsive to said character counter means for preventing the transfer of translated signals from said signal translating means to said data output means from the time a first particular count is in said character counter means until the time a second particular count is in said character counter means.

7. Data translating apparatus comprising data input means for serially converting groups of character-representing indicia, recorded on a first record medium, to coded combinations of converted signals; data decoder means responsive to said data input means for generating, for each particular one of the possible converted signal combinations, an electrical signal unique to such particular combination; data encoder means responsive to said data decoder means for generating combinations of encoded signals respectively related to the unique electrical signals; storage means for temporarily storing the encoded signal combinations; data output means responsive to said storage means for reconverting the stored signal combinations to character-representing indicia compatible with recording on a second record medium; character counter means for counting the characters converted by said data input means; and specific character suppression means responsive to said data decoder means to receive the unique electrical signal representing a specific character to be suppressed for preventing the transfer of such electrical signal to said data encoder means and for preventing said character counter means from counting said specific character.

8. Data translating apparatus comprising data input means for serially converting groups of character-representing indicia, recorded on a first record medium, to coded combinations of converted signals; data decoder means responsive to said data input means for generating, for each particular one of the possible converted signal combinations, an electrical signal unique to such particular combination; data encoder means responsive to said data decoder means for generating combinations of encoded signals respectively related to the unique electrical signals; storage means for temporarily storing the encoded signal combinations; data output means responsive to said storage means for reconverting the stored signal combinations to character-representing indicia compatible with recording on a second record medium; character counter means for counting the characters converted by said data input means; selective translation means responsive to said data decoder means and said character counter means for causing said data encoder means to transmit a specific combination of encoded signals for the electrical signal representing a specific character as long as said character counter means does not contain a given count and for causing said data encoded means to transmit a different combination of encoded signals when said character counter means contains said given count.

9. Data translating apparatus comprising data input means for serially converting groups of character-representing indicia, recorded on a first record medium, to coded combinations of converted signals; data decoder means responsive to said data input means for generating, for each particular one of the possible converted signal combinations, an electrical signal unique to such particular combination; data encoder means responsive to said data decoder means for generating combinations of encoded signals respectively related to the unique electrical signals; storage means for temporarily storing the encoded signal combinations; data output means responsive to said storage means for reconverting the stored signal combinations to character-representing indicia compatible with recording on a second record medium; character counter means for counting the characters converted by said data input means; character insertion means responsive to said character counter means for delaying the transfer of encoded signal combinations from said storage means and for transferring a particular encoded signal combination to said data output means when said character counter means contains a particular count.

10. Data translating apparatus comprising data input means for serially converting groups of character-representing indicia, recorded on a first record medium, to coded combinations of converted signals; data decoder means responsive to said data input means for generating, for each particular one of the possible converted signal combinations, an electrical signal unique to such particular combination; data encoder means responsive to said data decoder means for generating combinations of encoded signals respectively related to the unique electrical signals; storage means for temporarily storing the encoded signal combinations; data output means responsive to said storage means for reconverting the stored signal combinations to character-representing indicia compatible with recording on a second record medium; character counter means for counting the characters converted by said data input means; and zero suppression means including a two state control means responsive to said character counter means and said storage means, means coupling said two state control means to said character counter means for shifting said two state control means to a first state when said character counter means contains a first particular count to prevent transfer of stored signal combinations representing the character zero from said storage means to said data output means, and means coupling said two state control means to said character counter means and said storage means for shifting said control means to the second state when a second count is in said character counter means or said storage means is prepared to transfer a stored combination of signals representing a character other than zero.

11. Data translating apparatus comprising data input means for serially converting groups of character-representing indicia, recorded on a first record medium, to coded combinations of converted signals; data decoder means responsive to said data input means for generating, for each particular one of the possible converted signal combinations, an electrical signal unique to such particular combination; data encoder means responsive to said data decoder means for generating combinations of encoded signals respectively related to the unique electrical signals; storage means for temporarily storing the encoded signal combinations; data output means responsive to said storage means for reconverting the stored signal combinations to character-representing indicia compatible with recording on a second record medium; character counter means for counting the characters converted by said data input means; and character skipping means responsive to said character counter means for preventing the transfer of encoded signal combinations from said storage means from the time a first predetermined count is in said character counter means until a second predetermined count is in said character counter means.

12. In data translating apparatus which includes data input means for serially converting groups of character-representing indicia, recorded on a first record medium, to coded combinations of converted signals; data decoder means responsive to said data input means for generating, for each particular one of the possible converted signal combinations, an electrical signal unique to such particular combination; data encoder means responsive to said data decoder means for generating combinations of encoded signals respectively related to the unique electrical signals, storage means for temporarily storing the encoded signal combinations, and data output means responsive to said storage means for reconverting the stored signal combinations to character-representing indicia compatible with recording on a second record medium; editing apparatus comprising character counter means for counting the characters converted by said data input means, specific character suppression means responsive to said data decoder means to receive the unique electrical signal representing a specific character to be suppressed, for preventing the transfer of such electrical signal to said data encoder means and for preventing said character counter means from counting said specific character, selective translation means responsive to said data decoder means and said character counter means for causing said data encoder means to transmit a specific combination of encoded signals for the electrical signal representing a specific character as long as said character counter means does not contain a given count and for causing said data encoder means to transmit a different combination of encoded signals when said character counter means contains said given count, character insertion means responsive to said character counter means for delaying the transfer of encoded signal combinations from said storage means and for transferring a particular encoded signal combination to said data output means when said character counter means contains a particular count, zero suppression means including a two state control means responsive to said character counter means and said storage means, means coupling said two state control means to said character counter means for shifting said control means to a first state when said character means contains a first particular count to prevent transfer of encoded signal combinations representing the character zero from said storage means to said data output means, and means coupling said two state control means to said character counter means and said storage means for shifting said control means to the second state when a second count is in said character counter means or said storage means is prepared to transfer an encoded signal combination other than that representing the character zero, and character skipping means responsive to said character counter means for preventing the transfer of encoded signal combinations from said storage means from the time a first predetermined count is in said character counter means until a second predetermined count is in said character counter means.

13. In data translating apparatus which includes data input means for serially converting groups of character-representing indicia, recorded on a first record medium, to coded combinations of converted signals; data decoder means responsive to said data input means for generating, for each particular one of the possible converted signal combinations, an electrical signal unique to such particular combination; data encoder means responsive to said data decoder means for generating combinations of encoded signals respectively related to the unique electrical signals, storage means for temporarily storing the encoded signal combinations, and data output means responsive to said storage means for reconverting the stored signal combinations to character-representing indicia compatible with recording on a second record medium; editing apparatus comprising character counter means for counting the characters converted by said data input means, specific character suppression means responsive to said data decoder means to receive the unique electrical signal representing a specific character to be suppressed, for preventing the transfer of such electrical signal to said data encoder means and for preventing said character counter means from counting said specific character, and selective translation means responsive to said data decoder means and said character counter means for causing said data encoder means to transmit a specific combination of encoded signals for the electrical signal representing a specific character as long as said character counter means does not contain a given count and for causing said data encoder means to transmit a different combination of encoded signals when said character counter means contains said given count.

14. In data translating apparatus which includes data input means for serially converting groups of character-representing indicia, recorded on a first record medium, to coded combinations of converted signals; data decoder means responsive to said data input means for generating, for each particular one of the possible converted signal combinations, an electrical signal unique to such particular combination; data encoder means responsive to said data decoder means for generating combinations of encoded signals respectively related to the unique electrical signals, storage means for temporarily storing the encoded signal combinations, and data output means responsive to said storage means for reconverting the stored signal combinations to character-representing indicia compatible with recording on a second record medium; editing apparatus comprising character counter means for counting the characters converted by said data input means, character insertion means responsive to said character counter means for delaying the transfer of encoded signal combinations from said storage means and for transferring a particular encoded signal combination to said data output means when said character counter means contains a particular count, zero suppression means including a two state control means responsive to said character counter means and said storage means, means coupling said two state control means to said character counter means for shifting said control means to a first state when said character counter means contains a first particular count to prevent transfer of encoded signal combinations representing the character zero from said storage means to said data output means, and means coupling said two state control means to said character counter means and said storage means for shifting said control means to the second state when a second count is in said character counter means or said storage means is prepared to transfer an encoded signal combination other than that representing the character zero, and character skipping means responsive to said character counter means for preventing the transfer of encoded signal combinations from said storage means from the time a first predetermined count is in said character counter means until a second predetermined count is in said character counter means.

15. Data translating apparatus comprising data input means for serially converting groups of character-representing indicia, recorded on a first record medium, to coded combinations of converted signals; data decoder means responsive to said data input means for generating, for each particular one of the possible converted signal combinations, an electrical signal unique to such particular combination; data encoder means responsive to said data decoder means for generating combinations of encoded signals respectively related to the unique electrical signals; storage means for temporarily storing the encoded signal combinations; data output means responsive to said storage means for reconverting the stored signal combinations to character-representing indicia compatible with recording on a second record medium; character counter means for counting the characters converted by said data input means; specific character suppression means responsive to said data decoder means to receive the unique electrical signal representing a specific character to be suppressed, for preventing the transfer of such electrical signal to said data encoder means and for preventing said character counter means from counting said specific character, selective translation means responsive to said data decoder means and said character counter means for causing said data encoder means to transmit a specific combination of encoded signals for the electrical signal representing a specific character as long as said character counter means does not contain a given count and for causing said data encoder means to transmit a different combination of encoded signals when said character counter means contains said given count, character insertion means responsive to said character counter means for delaying the transfer of encoded signal combinations from said storage means and for transferring a particular encoded signal combination to said data output means when said character counter means contains a particular count, zero suppression means including a two state control means responsive to said character counter means and said storage means, means coupling said two state control means to said character counter means for shifting said control means to a first state when said character counter means contains a first particular count to prevent transfer of encoded signal combinations representing the character zero from said storage means to said data output means, and means coupling said two state conrol means to said character counter means and said storage means for shifting said control means to the second state when a second count is in said character counter means or said storage means is prepared to transfer an encoded signal combination other than that representing the character zero, and character skipping means responsive to said character counter means for preventing the transfer of encoded signal combinations from said storage means from the time a first predetermined count is in said character counter means until a second predetermined count is in said character counter means.

References Cited in the file of this patent

UNITED STATES PATENTS

| | | |
|---|---|---|
| 2,853,696 | Mendelson | Sept. 23, 1958 |
| 2,954,731 | Duranel et al. | Oct. 4, 1960 |
| 3,008,127 | Bloch et al. | Nov. 7, 1961 |